United States Patent Office 3,035,552
Patented May 22, 1962

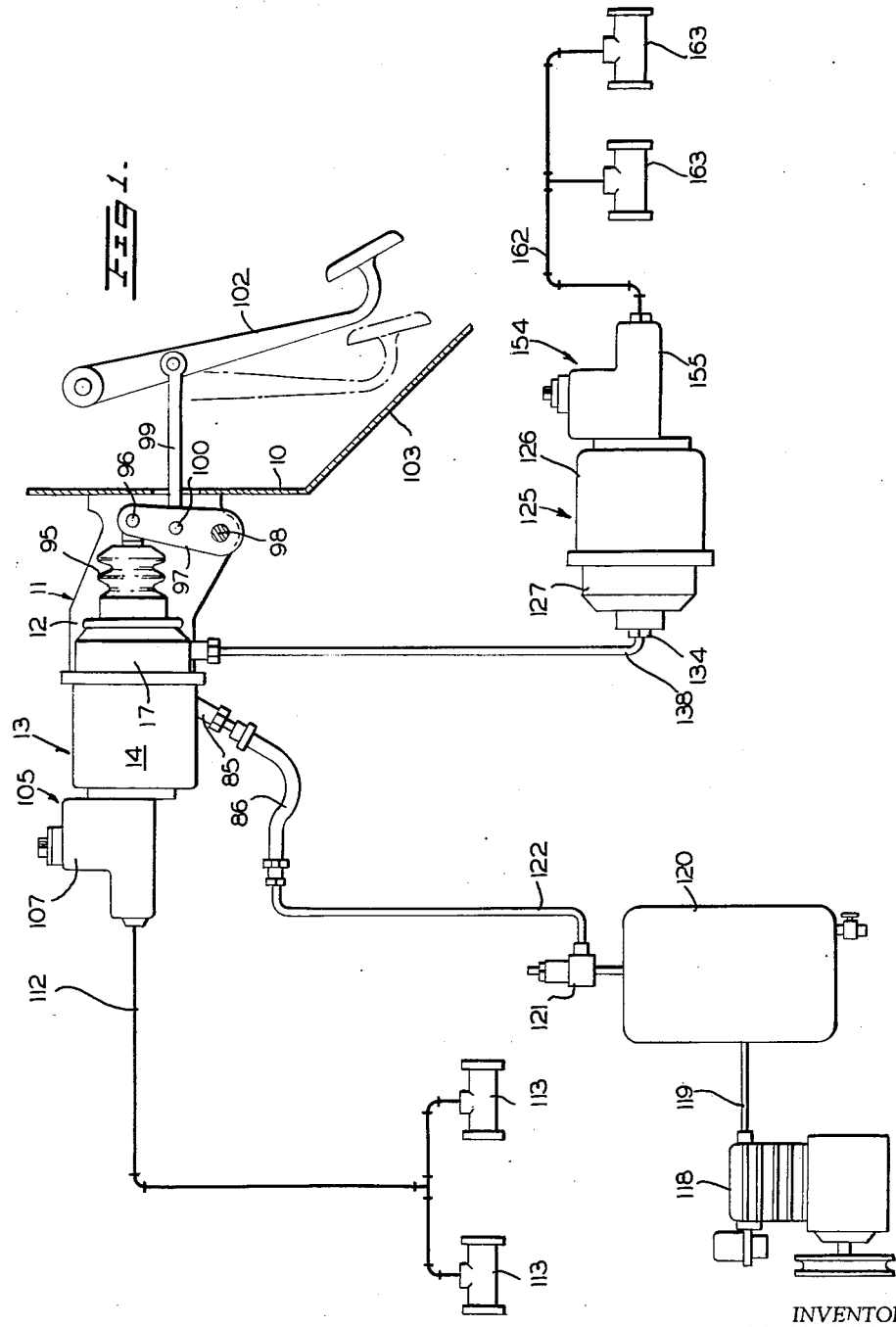

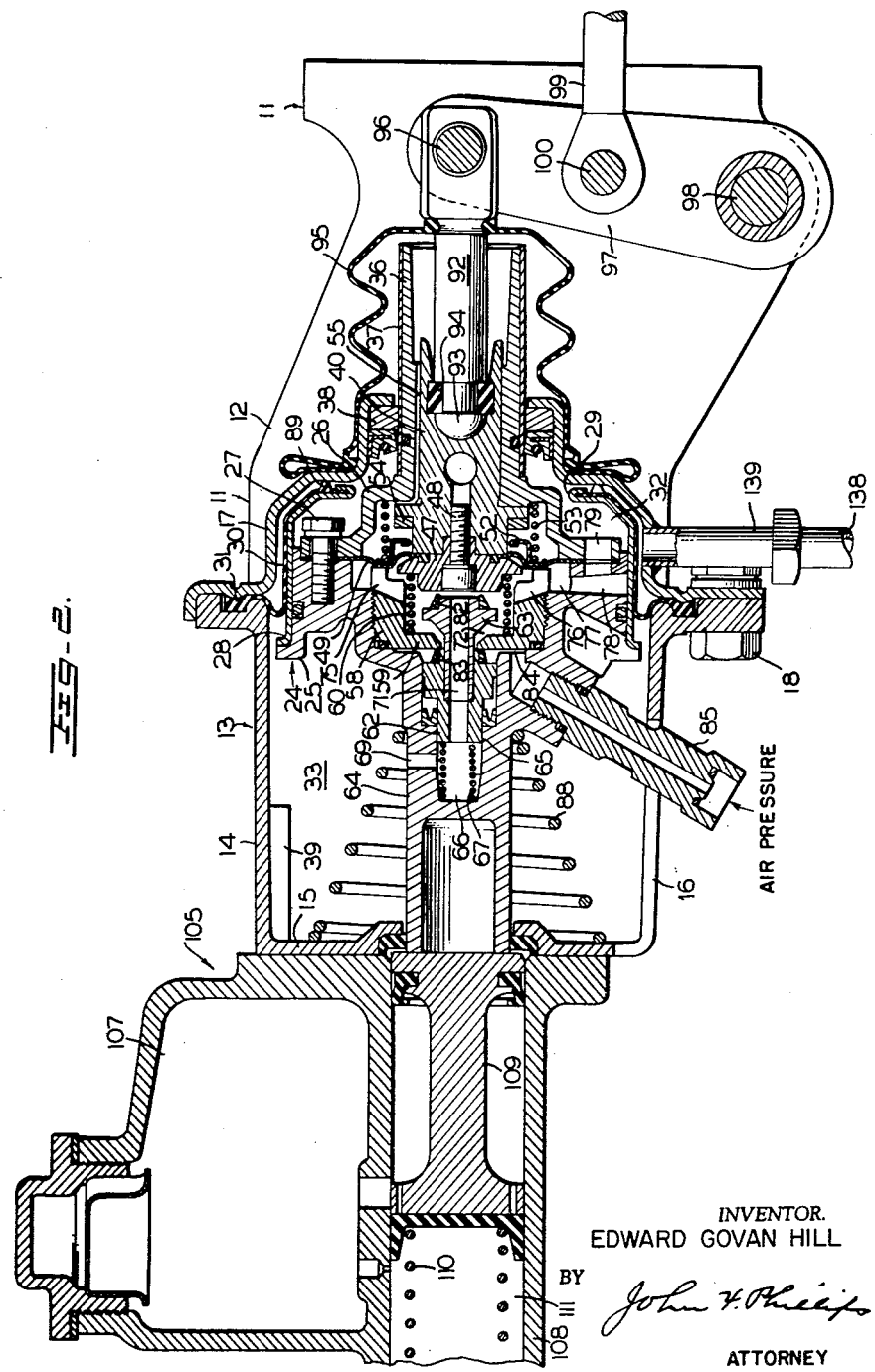

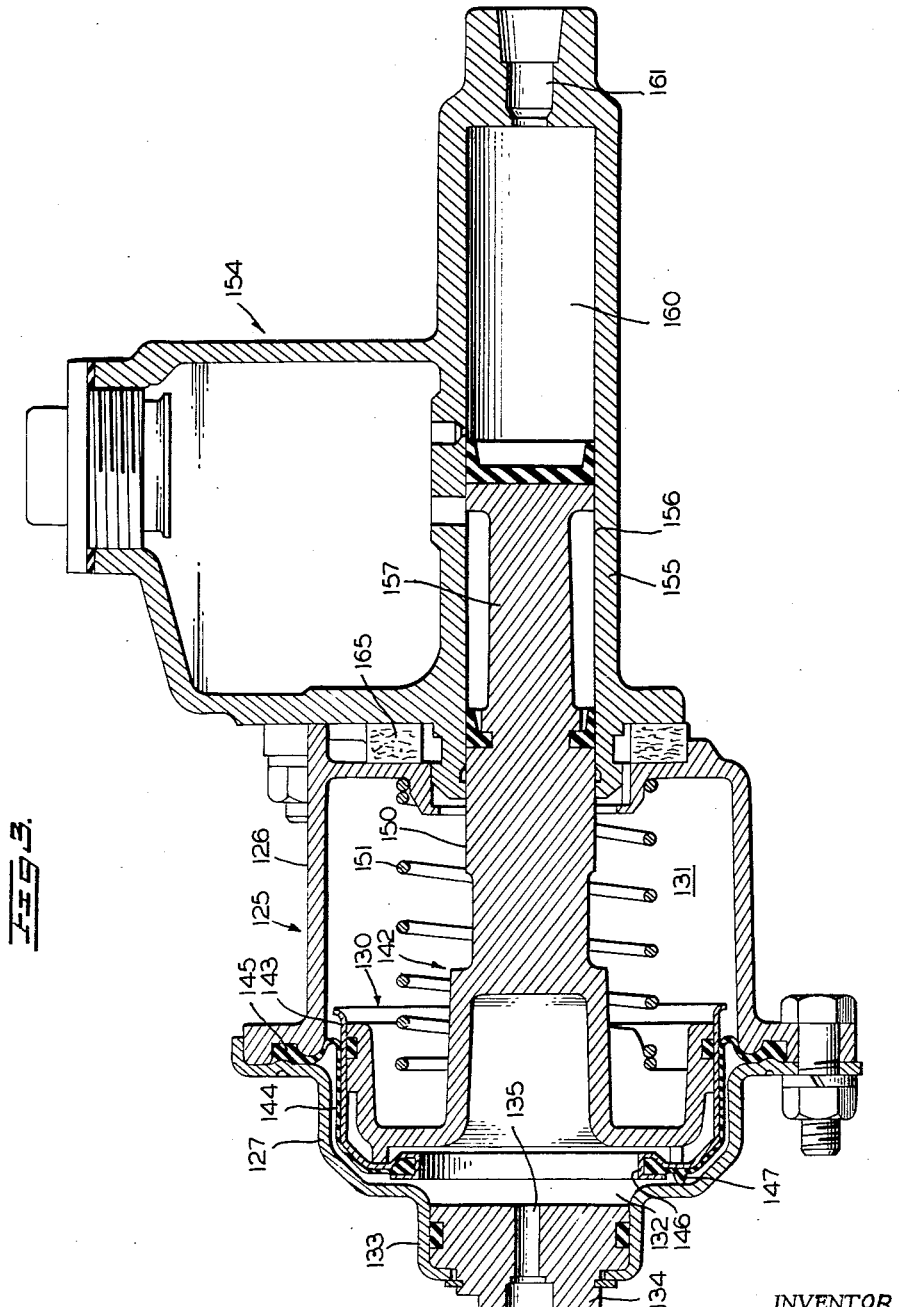

3,035,552
BOOSTER BRAKE MECHANISM
Edward Govan Hill, Birmingham, Mich., assignor to Kelsey-Hayes Company, Detroit, Mich., a corporation of Delaware
Filed Mar. 27, 1959, Ser. No. 802,349
3 Claims. (Cl. 121—41)

This invention relates to a booster brake mechanism for motor vehicles.

It has been proposed to provide in a power brake system for motor vehicles a pair of motors each having a master cylinder associated therewith and each master cylinder being connected to the brake cylinders for one end of the vehicle. In some such systems, the motor for the front wheel brakes, for example, is a booster motor, pedal forces being employed in one way or another for assisting such motor in applying the front wheel brakes, while the rear brakes are applied solely by the force of the motor associated therewith.

A mechanism of the type referred to is highly advantageous since unlimited braking forces can be applied to the front wheels, which support the weight of the vehicle engine, while the limiting of the power applied to the rear wheels tends to prevent the locking and sliding of such wheels with a consequent loss of braking forces. Such systems in the past, however, have involved disadvantages. For example, whether the valve mechanism for the two motors is operated mechanically or by hydraulic fluid displaced from a pedal operated master cylinder, inaccurate reactions have been transmitted to the brake pedal and there have been losses due to friction, line resistances in fluid lines, etc. In a mechanical lever and linkage operation of the valve mechanism, employed also for assisting the booster motor, there are off-center forces applied at various points which render the mechanisms inefficient from the standpoint of utilizing all forces for brake application and also from the standpoint of providing accurate reaction against the brake pedal.

An important object of the present invention is to provide a novel system of the general character referred to, wherein a fluid pressure operated booster motor is employed for applying the front wheel brakes of a motor vehicle, where the system is used on passenger cars, and a slave motor connected to the master motor is employed for applying the rear wheel brakes, and wherein direct in-line valve operating forces applied to the valve mechanism for the booster motor greatly smooth out the operation of the system as a whole and provide for more accurate reaction against the brake pedal.

A further object is to provide such a mechanism wherein the reaction transmitting means is associated with the booster motor and is sensitive to pressures supplied to both the master and slave motors during a substantial range of operation of the brake mechanism, thus assisting in making accurate the transmission of reaction to the brake pedal.

A further object is to provide a system of this character wherein the reaction means is housed within the booster motor and is concentric with the valve mechanism and its operating means and wherein the reaction means is responsive to differential pressures in the booster motor, which pressures are always the same as pressures to which the slave motor is subjected, thus making accurate the transmission of reaction to the brake pedal during most brake operating conditions.

A further object is to provide such a mechanism wherein the reaction means transmits reaction forces to the brake pedal in proportion to differential pressures affecting the two motors except in the later stages of brake actuation, after the motors have been fully energized, during which later stages the operator transmits direct forces through the pressure responsive unit of the master motor to assist the latter in securing a full application of the brakes associated with the master motor.

A further object is to provide a mechanism of the character referred to, wherein movement of the pressure responsive unit of the master motor is limited at a point beyond its normal path of travel but ahead of the point where the brake pedal will touch the toe board whereby, in the event of a break in the hydraulic lines to the front wheel cylinders, movement of the pressure responsive unit of the master motor will be arrested while there is still sufficient pedal travel to enable the driver to operate the valve mechanism and thus energize the slave motor to apply the rear wheel brakes.

A further object is to provide such a mechanism wherein the control valve mechanism is of the follow-up type whereby, in the event of a failure of the hydraulic lines to the front wheel brakes, the operator may secure a fully modulated action of the slave motor for applying the rear wheel brakes.

Other objects and advantages of the invention will become apparent during the course of the following description.

In the drawings I have shown one embodiment of the invention. In this showing:

FIGURE 1 is a generally diagrammatic view of the entire brake system;

FIGURE 2 is an enlarged fragmentary axial sectional view through the booster motor and associated elements, the parts being shown in off brake positions; and FIGURE 3 is an axial sectional view through the slave motor and associated elements with the parts in off positions.

Referring particularly to FIGURE 1, the numeral 10 indicates the fire wall for a motor vehicle having a U-shaped bracket 11 fixed against the forward face thereof and provided with parallel side walls 12. These walls forwardly thereof support a booster motor indicated as a whole by the numeral 13.

The motor 13 comprises a generally cylindrical forward housing 14 having a forward end wall 15, and the bottom of the housing 14 is slotted as at 16 for a purpose to be described. The motor also includes a rear housing member 17, and the two motor housing members are bolted together as at 18 (FIGURE 2). Opposite sides of the motor are suitably secured to the forward extremities of the bracket side walls 12.

Within the motor is a pressure responsive unit indicated as a whole by the numeral 24 (FIGURE 2) comprising preferably die-cast body sections 25 and 26 secured together as at 27. The body member 25 has a cylindrical outer surface on which is pressed an annular preferably pressed steel member 28 extending rearwardly of the body member 25 and having a radially inward extremity 29 crimped over to clamp in position the inner periphery of a rolling diaphragm 30. Such diaphragm has its outer periphery beaded as at 31 and clamped between the motor housing members 14 and 17. The pressure responsive unit of the motor, including the diaphragm 30, divides the motor to form a variable pressure chamber 32 and an atmospheric chamber 33, the latter of which is open to the atmosphere through the slot 16. The body member 26 has a rearwardly extending sleeve portion 36 on which is pressed a preferably stainless steel tube 37 slidable through a combined bearing and sealing unit 38. Such unit is carried by the rear motor housing 17, as shown in FIGURE 2. The motor housing 14 is provided with an abutment 39 to engage the body member 25 of the pressure responsive unit of the motor under conditions and for a purpose to be described.

A manually operable member 40 is axially slidable in the sleeve portion 36 and is provided with a cap member 47 secured to the inner end thereof by a screw 48. The cap member 47 clamps against the inner end of the member 40 the inner perpihery of a diaphragm 49, having its outer periphery clamped between the radially outer portions of the body members 25 and 26. A reaction washer 52 engages against the diaphragm 49, and the washer and diaphragm are biased toward the left in FIGURE 2 by a spring 53 to assume the normal position shown.

A rubber bumper 54 is carried by the member 40 and is engaged by the inner flange of the reaction washer 52 when the motor is energized, as will become apparent below. The sleeve portion 36 is grooved as at 55 to vent to the atmosphere the chamber in which the spring 53 is arranged.

A nut 58 is threaded in the body member 25 and provided with an in-turned flange 59 having an axial opening therethrough. A spring 60 has opposite ends respectively engaging the flange 59 and cap 47 to urge the latter and the elements connected thereto toward the off position shown in FIGURE 2.

A valve unit comprising elements 62 and 63 is mounted to slide in the body member 25. The latter member is provided with a forwardly extending axial portion 64 having a bore 65 in which the forward end of the member 62 is slidable. The forward end of this bore forms a chamber 66, and a spring 67 in such chamber biases the members 62 and 63 toward the right in FIGURE 2. The chamber 66 communicates through a lateral port 69 with the chamber 33 and thus with the atmosphere. An axial passage 71 is formed in the members 62 and 63. This passage opens at its forward end into the chamber 66 and at its rear end into a control chamber 72 formed rearwardly of the flange 69 and in which the spring 60 is arranged.

An annular flange 75 is formed on the nut 58 and the diaphragm 49 normally engages such flange. The flange 75 is grooved as at 76 so that the chamber 72 normally communicates with a radially outer chamber 77 which, in turn, communicates through passages 78 and 79 with the chamber 32.

The member 63 is provided with a rubber or similar valve 82 projecting slightly beyond the rear end of the member 63. The valve 82 is engageable with the cap 47 under conidtions to be described, but is normally disengaged therefrom. The member 62 carries a similar rubber valve 83 normally engaged with the forward face of the flange 59.

The space surrounding the valve 83 forms a pressure chamber 84 communicating with the axial passage of a connector 85 extending through the slot 16. The connector 85 communicates with one end of a flexible hose 86 (FIGURE 1), further described below.

All of the parts of the motor 13 are shown in normal positions in FIGURE 2, the various elements associated with the valve mechanism being biased to such positions by the springs 53, 60 and 67. The pressure responsive unit of the motor as a whole is biased to off position by a return spring 88, and movement of the unit to off position is limited by engagement with the motor housing 17 of an annular bumper 89 formed on the diaphragm 30.

Movement is imparted to the member 40 by a push rod 92 having a hemispherical end 93 maintained in position by a rubber ring 94. A boot 95 is connected between the push rod 92 and the motor housing 17.

The motor as disclosed in FIGURE 2 forms per se no part of the present invention except as features thereof operate in combination with the remaining portions of the system, as described below. The motor per se is disclosed and claimed in the copending application of David T. Ayers, Jr., Serial No. 747,424, filed July 9, 1958, now Patent No. 2,953,120.

The rod 92 is pivoted at 96 to the upper end of a lever 97, the lower end of which is pivoted as at 98 to the bracket walls 12. A pedal-operated push rod 99 is pivoted as at 100 to the lever 97 intermediate its ends, and the rear end of the rod 99 (FIGURE 1) is connected as at 101 to a depending pedal lever 102 of conventional type. The pedal 102 operates over and rearwardly of a conventional toe board 103. The broken line position of the pedal in FIGURE 1 represents the maximum movement of the pedal toward the toe board, a position which is beyond the normal path of travel of the pedal. In the event of a failure in the hydraulic lines 112, no pressure will be built up in the master cylinder described below, in which case the body member 25 will engage the abutment 39 to limit movement of the pedal 102 while the latter is no lower than the broken line position shown in FIGURE 1. Under such conditions, the valve mechanism of the motor 13 is still subject to operation by the brake pedal, as further described below.

A conventional master cylinder indicated as a whole by the numeral 105 is secured in any suitable manner to the forward wall 15 of the motor housing 14. This master cylinder comprises a conventional reservoir 107 and a conventional master cylinder bore 108 in which is slidable the usual plunger 109, the rear end of which abuts the axial extension 64 to be actuated thereby. The plunger 109 is biased rearwardly by the usual spring 110 having its forward end preferably engaging a conventional residual pressure valve (not shown). The pressure end of the bore 108 forms a chamber 111 communicating through lines 112 (FIGURE 1) with the conventional wheel cylinders 113. In a passenger vehicle, these will be the wheel cylinders for the front wheels, for reasons which will become apparent.

The motor 13 is shown in the present instance as being of the super-atmospheric pressure operated type. To furnish such pressure, the motor vehicle is provided with a suitable driven compressor 118 having its outlet piped as at 119 to an air reservoir 120. The outlet of such reservoir is provided with a conventional pressure regulating valve 121 piped as at 122 to the other end of the flexible hose 86.

Application of the rear vehicle brakes is accomplished through operation of a slave motor indicated as a whole by the numeral 125 (FIGURE 3). Such motor comprises a generally cylindrical body member 126 and a cap-like body member 127, which may be substantially identical with the body member 17 in FIGURE 2.

The housing members of the motor 125 are divided by a pressure responsive unit indicated as a whole by the numeral 30 to form an atmospheric chamber 131 and a variable pressure chamber 132. The axially extending portion 133 of the motor housing member 127 houses a fitting 134 provided with an axial opening 135 communicating with the motor chamber 132. The fitting 134 is connected to one end of a pipe 138 (FIGURE 1), and the other end of this pipe connects with a fitting 139 communicating with the variable pressure chamber 32 of the motor 13. Pressure in the latter chamber accordingly will be communicated to the slave motor chamber 132.

The pressure responsive unit 130 of the slave motor is provided with a preferably die-cast body 142, over the periphery of which is pressed a preferably steel shell 143 on which is mounted a rolling diaphragm 144 having an outer peripheral bead 145 clamped between the adjacent flange portions of the housing members 126 and 127. The inner bead of the diaphragm 144 is fixed relative to the shell 143 by crimping the latter therearound as at 146. Movement of the pressure responsive unit to the off position in FIGURE 3 is limited by a rubber bumper 147 formed integral with the diaphragm 144. The body 142 is provided with an axially extended portion 150, further described below, and the pressure responsive unit 130 is biased to its off position by a spring 151.

A generally conventional master cylinder unit indicated as a whole by the numeral 154 is associated with the motor 125. The master cylinder unit comprises a master cylinder 155 having a bore 156 in which is slidable the rear portion of the axial extension 150, formed as a master cylinder plunger 157.

The plunger 157 forms with the master cylinder 155 a pressure chamber 160 communicating through a port 161 with lines 162 (FIGURE 1) leading to the rear wheel brake cylinders 163.

It will become apparent that successive operations of the brake system will alternately expel air from the chamber 131 and draw air thereinto. Accordingly, an air cleaning unit 165, annular in form, is arranged between adjacent walls of the motor housing 126 and master cylinder unit 154, thus cleaning air flowing into the chamber 131.

Operation

FIGURE 2 shows the parts of the master or booster motor in normal positions, the variable pressure motor chamber 32 communicating with the atmosphere through the various passages and chambers 79 and 78, 76, 72, 71, 66, 69, and 33. The high pressure or application valve 83 will be closed, as shown, and accordingly superatmospheric pressure cannot pass beyond the chamber 84. When the brake pedal 102 is operated, the rod 99 (FIGURE 2) will be moved to the left, and the lever 97 will similarly move the rod 92 and member 40. The forward face of the cap 47 will engage the valve 82, thus closing the atmospheric passage 71 to the chamber 72, and the valve elements will be in lap positions.

Slight further movement of the brake pedal will cause the cap 47 to effect axial movement of the members 62 and 63, thus opening valve 83 to connect the high pressure chamber 84 to the chamber 72. This chamber communicates with the motor chamber 32 as described above, and accordingly the initial cracking of the valve 83 builds up differential pressures on opposite sides of the pressure responsive unit 24 to move the latter toward the left from the position shown in FIGURE 2. Thus fluid displacing movement of the plunger 109 will start, and initial operation of the plunger 109 will effect movement of the brake shoes into engagement with the brake drums of the front vehicle wheels. It will be apparent that the motor chamber 32 communicates through the line 138 (FIGURE 1) with the motor chamber 132 (FIGURE 3), and the same differential pressures which exist on opposite sides of the pressure responsive unit 24 of the master motor will exist on opposite sides of the pressure responsive unit 130 of the slave motor. Accordingly, the plunger 157 will displace fluid from the chamber 160 to move the brake shoes of the rear wheels into engagement with their drums. The pressure in the master cylinder chambers 111 and 160 will be approximately equal.

Initial movement of the brake pedal described above takes place solely against resistance of the spring 60 counterbalanced in part by the loading of the lighter spring 53. As soon as the valve 83 is cracked and a slight increase in pressure occurs in the chamber 72, the pressure will act against left-hand surface portions of the cap 47 to tend slightly to resist movement of the member 40 by the brake pedal, thus providing the brake pedal with a slight degree of reaction. Such pressure also acts against the diaphragm 49. Initial reaction will be effected in the manner stated. An initial increase in pressure in the chambers 72 and 77 will not immediately affect the diaphragm 49, however, since the spring 53 tends to maintain the diaphragm in engagement with the shoulder 75. When pressure in the chamber 77 increases to the point where the loading of the spring 53 is overcome, the diaphragm 49 will move away from the shoulder 75 and its reactionary force will be added to that of the cap 47, thus providing a second stage of reaction against the brake pedal.

It will be particularly noted that the admission of a given quantity of air at given pressure into the motor chamber 32 does not effect a proportionate reaction against the brake pedal since the chamber 32 communicates with the slave motor chamber 132 (FIGURE 3). Thus the reaction pressures in early stages of brake reaction will reflect the pressures in the variable pressure chambers of both of the motors. Thus the "feel" reacting against the brake pedal will be a reflection of the degree of application of both the forward and rear brakes. This is important in providing accurate reaction against the brake pedal in a system of this character, and the accuracy of the reaction is preserved by the fact that all of the parts of the master motor in FIGURE 2 are coaxial to eliminate any eccentricity, or angular application of forces. The accuracy is also enhanced by the fact that the type of motor illustrated is practically completely lacking in any artificial resistances to movement of the parts incident to the use of pressure seals. The only seal employed with respect to the axially pedal movable elements of the motor is the small seal surrounding the member 62, which seal offers substantially negligible resistance.

It will be apparent in view of the foregoing that the mechanism provides an initial soft pedal, followed by a stage of reaction transmitted to the brake pedal as soon as super-atmospheric pressure is supplied to the chamber 72, and such reaction will be proportional to the equal pressure existing in the motor chambers 32 and 132.

The conditions referred to take place throughout what may be termed normal brake applications, that is applications which take place to an extent which is within the limits of the full energization of the motors 13 and 125. Thus a highly accurate reaction is provided which remains proportional, during average brake applications, to the same pressure existing in the variable pressure chambers of the two motors. Under such conditions there will never be any reaction against the brake pedal at a ratio greater with respect to the motor 13 than with respect to the motor 125.

In the event of a full or "panic" application of the brakes the member 40 will be moved to the left to its limit of movement relative to the pressure responsive unit, under which conditions the peripheral portions of the cap 47 will engage the annular shoulder within the shoulder 75. Thus, when the motor 13 is energized to its full extent, further application of the front wheel brakes may be effected, limited only by the ability of the operator to exert force against the brake. Thus greater applications of the front wheel brakes in a passenger vehicle can be secured, but this will not affect the application of the rear wheel brakes, which can be applied with progressively increasing force only up to the maximum degree of energization of the slave motor 125. This limiting of the maximum application of the rear wheel brakes usually prevents the locking and skidding of the rear wheels, and the maintaining of traction between the rear wheels and the highway thus provides for maximum deceleration of the rear wheels and of the vehicle as a whole.

Upon the releasing of the brake pedal, the spring 60 will move the cap 47 toward the right and the members 62 and 63 will follow such movement because of the operation of the spring 67, until the valve 83 engages the flange 59. Further movement of the cap 47 to the right in FIGURE 2 will then open the valve 82 and restore communication between the chamber 72 and the atmospheric passage 71 to exhaust pressure from the motor chamber 32 into the motor chamber 33. The same exhaustion of air takes place from the slave motor, since the pipe 138 communicates with the chamber 32. The return springs 88 and 151 of the respective motors will return the pressure responsive units thereof to their normal off positions. Of course, the exhausting of pressure from the chamber 72 relieves the pressure acting against the diaphragm 49, and the spring 53 will move the diaphragm to its normal position in engagement with the flange 75.

The use of the lever 97 is optional according to the ratio of the lever arms of the brake pedal. Its use is desirable where a standard brake pedal ratio of 5:1 is employed. However, the booster motor can be operated by directly connecting the rod 92 to the brake pedal by using a pedal with a ratio of 3:1 to 3.5:1.

A motor construction of the type shown in FIGURE 2 is particularly efficient for use in the system employing the slave motor. All valve and motor forces associated with the booster motor are transmitted axially of the motor to eliminate any tendency for binding to occur between the parts. The direct in-line operation of the elements also permits the substantially complete elimination of friction-creating seals. Moreover, the use of pressure responsive units having rolling diaphragms eliminates any inherent frictional resistance as is present in the use of a piston type motor. Accordingly, the pressure in the variable pressure chamber of each motor is directly proportional to brake-operating forces delivered to the master cylinder pistons. Thus not only is the booster motor particularly smooth in operation in itself, but it is particularly efficient in combination with the slave motor, especially with relation to the transmission of reactions to the brake pedal. Such reactions are highly accurate and reflect the true brake-operating pressures in both motors, such pressures not being influenced by inherent friction in the motors.

The type of motor illustrated in FIGURE 2 is important for a further reason, namely, to take care of possible emergencies. If the hydraulic lines 162 (FIGURE 1) to the rear wheel brakes should be ruptured so that no pressure can be built up in the chamber 160, operation of the valve mechanism will move the pressure responsive unit 130 to its limit of movement, and the valve mechanism of the master motor 13 will then operate such motor to apply the front wheel brakes.

If a rupture should occur in the lines 112 (FIGURE 1) to the front wheel brake cylinders, no pressure can be built up in the chamber 111 (FIGURE 2) and the pressure responsive unit 24 will tend to move to its left-hand limit of movement as viewed in FIGURE 2. Such limit will be reached when the body member 25 engages the abutment 39. The rear end of this abutment is beyond the forward limit of movement of the body member 25 under all normal brake operations. For example, where no actual pedal pressures are applied to the pressure responsive unit 24, so that the front wheel brakes are applied solely by the motor 13, the body member 25 will stop appreciably short of the abutment 39. If the operator continues to apply pedal pressure after the motor 13 is energized to its maximum extent, a slight additional movement of the pressure responsive unit 25 will take place. The body member 25 still will be spaced from the abutment 39, and its position at such time represents the normal maximum travel of the pressure responsive unit.

Therefore, the abutment 39 does not interfere with the normal functioning of the parts. In the event of a rupture of the type referred to, however, the body member will engage the abutment 39, and such engagement takes place before the pedal 102 (FIGURE 1) reaches the toe board 103, for example, the position shown in broken lines in FIGURE 1. The coordination of the positioning of the abutment 39, the pedal 102 and the toe board 103, therefore, is such that if the front brake lines rupture, movement of the pressure responsive unit 24 will be stopped while the brake pedal 102 is still capable of further movement. From the broken line position in FIGURE 1, therefore, the driver may further depress the brake pedal to operate the valve mechanism and thus activate the slave motor 125 to apply the rear wheel brakes. Since the valve mechanism obviously is of the follow-up type, it will be apparent that under the emergency condition referred to, a fully modulated action of the slave motor is provided for. Thus upon a rupture of either set of hydraulic brake lines, one set of brakes will be operable to control the vehicle.

It will be noted that the reaction elements 47 and 49 operate under all conditions when the valve mechanism is actuated. Therefore, during normal brake applications, valve operating movement of the member 40 will be opposed by master motor pressures. This also will be true if the master motor alone is operated, upon a rupturing of the lines 162, and if the slave motor 125 alone is operated, in the event of a rupture in the lines 112. Therefore, even under the emergency conditions referred to, modulated motor operation takes place, and reaction will be transmitted to the brake pedal.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake mechanism comprising a master fluid pressure motor having a casing and a pressure responsive unit therein, such unit comprising an axial cast body and an annular diaphragm connected between said body and said casing, said pressure responsive unit forming with said casing a variable pressure chamber, a device to be operated connected to said pressure responsive unit, a valve mechanism comprising a plurality of elements coaxial with and arranged in said cast body and including a manually operable element movable from a normal position to operate said valve mechanism to connect said variable pressure chamber to a source of pressure, means in said cast body coaxial therewith and responsive to pressures in said variable pressure chamber and connected to said manually operable element to oppose valve operating movement thereof, a slave motor comprising a casing having a second pressure responsive unit therein forming with said last-named casing a variable pressure chamber, said second pressure responsive unit comprising an axial body and an annular diaphragm connected between such body and said casing of said slave motor, a second device to be operated connected to said second pressure responsive unit, and a conduit connecting the variable pressure chambers of said motors to each other.

2. A booster brake mechanism comprising a master fluid pressure motor having a casing and a pressure responsive unit therein, such unit comprising an axial cast body and an annular diaphragm connected between said body and said casing, said pressure responsive unit forming with said casing a variable pressure chamber, a device to be operated connected to said pressure responsive unit, a valve mechanism comprising a plurality of elements coaxial with and arranged in said cast body and including a manually operable element movable from a normal position to operate said valve mechanism to connect said variable pressure chamber to a source of pressure, means in said cast body coaxial therewith and responsive to pressures in said variable pressure chamber and connected to said manually operable element to oppose valve operating movement thereof, means in and coaxial with said cast body and responsive to differential pressures between said variable pressure chamber and the atmosphere when such differential pressures increase above a predetermined point for additionally opposing valve operating movement of said manually operable element, a slave motor comprising a casing having a second pressure responsive unit therein forming with said last-named casing a variable pressure chamber, said second pressure responsive unit comprising an axial body and an annular diaphragm connected between such body and said casing of said slave motor, a second device to be operated connected to said second pressure responsive unit, and a conduit connecting the variable pressure chambers of said motors to each other.

3. A booster brake mechanism comprising a master fluid pressure motor having a casing and a pressure responsive unit therein, such unit comprising an axial cast body and an annular diaphragm connected between said body and said casing, said pressure responsive unit forming with said casing a variable pressure chamber, a device to be operated connected to said pressure responsive unit, a valve mechanism comprising a plurality of elements coaxial with and arranged in said cast body and including a manually operable element movable from a normal position to operate said valve mechanism to connect said variable pressure chamber to a source of pressure, said cast body having a control chamber therein communicating with said variable pressure chamber, means forming a part of said manually operable element and exposed to pressure in said control chamber to oppose valve operating movement of said manually operable element, an annular pressure responsive device coaxial with said cast body and connected to the latter and to said manually operable element and responsive to predetermined increases in pressure in said control chamber for additionally opposing valve operating movement of said manually operable element, a salve motor comprising a casing having a second pressure responsive unit therein forming with said last-named casing a variable pressure chamber, said second pressure responsive unit comprising an axial body and an annular diaphragm connected between such body and said casing of said slave motor, a second device to be operated connected to said second pressure responsive unit, and a conduit connecting the variable pressure chambers of said motors to each other.

References Cited in the file of this patent
UNITED STATES PATENTS

| | | |
|---|---|---|
| 1,770,194 | Bragg et al. | July 8, 1930 |
| 1,826,414 | Bragg et al. | Oct. 6, 1931 |
| 1,826,648 | Bragg et al. | Oct. 6, 1931 |
| 2,166,000 | Farmer | July 11, 1939 |
| 2,305,638 | Rockwell | Dec. 22, 1942 |
| 2,690,740 | Hupp | Oct. 5, 1954 |
| 2,752,892 | Banker | July 3, 1956 |